(12) United States Patent
Orr

(10) Patent No.: US 7,856,566 B2
(45) Date of Patent: Dec. 21, 2010

(54) STANDBY ARRANGEMENT FOR POWER SUPPLIES

(75) Inventor: Raymond K. Orr, Kanata (CA)

(73) Assignee: Power Integrations, Inc., San Jose, CA (US)

( * ) Notice: Subject to any disclaimer, the term of this patent is extended or adjusted under 35 U.S.C. 154(b) by 822 days.

(21) Appl. No.: 11/605,407

(22) Filed: Nov. 29, 2006

(65) Prior Publication Data

US 2007/0124615 A1 May 31, 2007

Related U.S. Application Data

(60) Provisional application No. 60/740,241, filed on Nov. 29, 2005.

(51) Int. Cl.
*G06F 1/26* (2006.01)

(52) U.S. Cl. .................. 713/320; 348/730; 363/21.07

(58) Field of Classification Search .................. 713/320; 363/21.07; 348/730
See application file for complete search history.

(56) References Cited

U.S. PATENT DOCUMENTS

| | | | | | |
|---|---|---|---|---|---|
| 5,414,475 | A | * | 5/1995 | Trzyna et al. | 348/730 |
| 5,920,466 | A | * | 7/1999 | Hirahara | 363/21.02 |
| 6,496,390 | B2 | * | 12/2002 | Yang | 363/21.07 |
| 6,525,666 | B1 | * | 2/2003 | Shimoda | 340/636.1 |

* cited by examiner

*Primary Examiner*—Albert Wang
(74) *Attorney, Agent, or Firm*—Blakely Sokoloff Taylor & Zafman, LLP

(57) ABSTRACT

An electronics product has a control unit responsive to a power-on remote control signal to enable DC power converters to supply power for normal operation of the product and to a microprocessor for responding to other remote control signals. The microprocessor controls the control unit to return to a standby mode of the product by disabling the DC power converters. The arrangement facilitates eliminating a conventional standby power supply and achieving a very low standby power consumption.

15 Claims, 2 Drawing Sheets

STANDBY ARRANGEMENT FOR POWER SUPPLIES

This application claims the benefit of U.S. Provisional Application No. 60/740,241 filed Nov. 29, 2005, the entire contents and disclosure of which are hereby incorporated herein by reference.

This invention relates to a standby arrangement for power supplies, for example for use in consumer electronics products such as televisions, home entertainment equipment and similar products with remote control receivers.

BACKGROUND

As is well known, many consumer electronics products include a remote control facility, typically using infrared communications but which may use radio frequency communications or other communications signals (including, for example, audio and ultrasonic signals), for use in controlling operation of the product. Such remote control generally includes an on/off control function, which is used to switch the product between a standby mode and a normal operating mode.

In the standby mode, power must be supplied to those parts of the product that are required to receive and respond to a remote control signal to switch the product to its operating mode. In the standby mode power may also be supplied for other functions, for example to maintain operation of clocks, timers, memory, and other features. The power used by the product in the standby mode is referred to as the standby power.

Although the standby power requirements of an individual consumer electronics product may be small compared with the operating power requirements, this standby power is consumed continuously, and there is a great number of such products, so that the total standby power consumption of such products is recognized as being very large.

Accordingly, there is a need for the standby power of individual consumer electronics products to be reduced to a very low level. For example, for some consumer electronics products (e.g. television receivers), maximum standby power requirements are specified by Energy Star® (www.energystar.gov) as being less than or equal to 1 watt. While such a low standby power can already be difficult to achieve for cost-sensitive products such as consumer electronics products, this maximum figure may be further reduced over time, and it is advantageous to reduce the standby power to well below this figure.

Additionally, such low standby power figures may be required to be met for a wide range of AC power supply voltages, for example in a range from about 90 to about 280 volts rms.

Typically, a consumer electronics product includes a standby power supply that is powered in the standby mode and provides power to the remote control receiver and to an associated microcontroller. The microcontroller is equipped with a mechanism to turn on one or more power supplies for normal operation of the product when a turn-on signal is produced by the user through the remote control. The standby power supply increases the cost of the product and also increases the standby power consumed by the product.

Accordingly, there is a need to provide an improved standby arrangement for use in consumer electronics products with a remote control receiver.

SUMMARY OF THE INVENTION

According to one aspect of this invention there is provided a standby arrangement comprising: a power supply arrangement for supplying, when enabled, power from a power supply input to a power supply output; a first control unit powered from the power supply input for enabling the power supply arrangement to supply power from the power supply input to the power supply output in response to a received remote control signal representing a power on signal; and a second control unit powered from the power supply output and responsive to other received remote control signals; the first control unit also being responsive to a power off signal from the second control unit to disable the power supply arrangement so that power is not supplied to the power supply output.

The first control unit can be conveniently powered from the power supply input via a resistor and a shunt regulator to provide a very low standby power consumption.

The power supply arrangement can provide electrical isolation between the power supply input and the power supply output, and the standby arrangement can further include an electrically isolating coupler for coupling the power off signal from the second control unit to the first control unit.

The standby arrangement can also include an electrically isolating coupler for coupling remote control signal information received by the first control unit to the second control unit, or it can include another remote control signal receiver for supplying remote control signals separately to the second control unit.

Preferably the power supply arrangement comprises at least one DC-DC converter having an enable input coupled to an output of the first control unit. It can further comprise a power factor correction circuit having an output coupled to an input of said at least one DC-DC converter and having an enable input coupled to an output of the first control unit.

The first control unit can also comprise a timer for enabling the power supply arrangement to supply power from the power supply input to the power supply output at a desired time.

According to another aspect, the invention provides a standby arrangement comprising: a receiver for receiving remote control signals; a first control unit coupled to the receiver and responsive to a power on signal received by the receiver to produce an enable signal; a power supply arrangement responsive to the enable signal to supply power from a power supply input to a power supply output; a second control unit supplied with power from the power supply output, the second control unit being responsive to other received remote control signals; and a coupler for coupling a power off signal from the second control unit to the first control unit, the first control unit being responsive to the power off signal to terminate the enable signal.

Thus in an embodiment of this invention the need for a conventional standby power supply is avoided by receiving and decoding a power-on remote control signal on the input side of an isolation boundary of the DC power converters. The standby circuit is designed to be powered directly from the high voltage power line or the rectified DC voltage from the power line and to consume very little power. It enables the DC converters in response to the power-on signal, whereupon other circuits are powered up for normal operation. These other circuits include a microprocessor that detects and responds to other remote control signals and that also controls the standby circuit to disable the DC power converters to return to the standby mode.

BRIEF DESCRIPTION OF THE DRAWINGS

The invention will be further understood from the following description by way of example with reference to the accompanying drawings, in which the same references are used in different figures to denote similar elements and in which.

DETAILED DESCRIPTION

Figure 1:
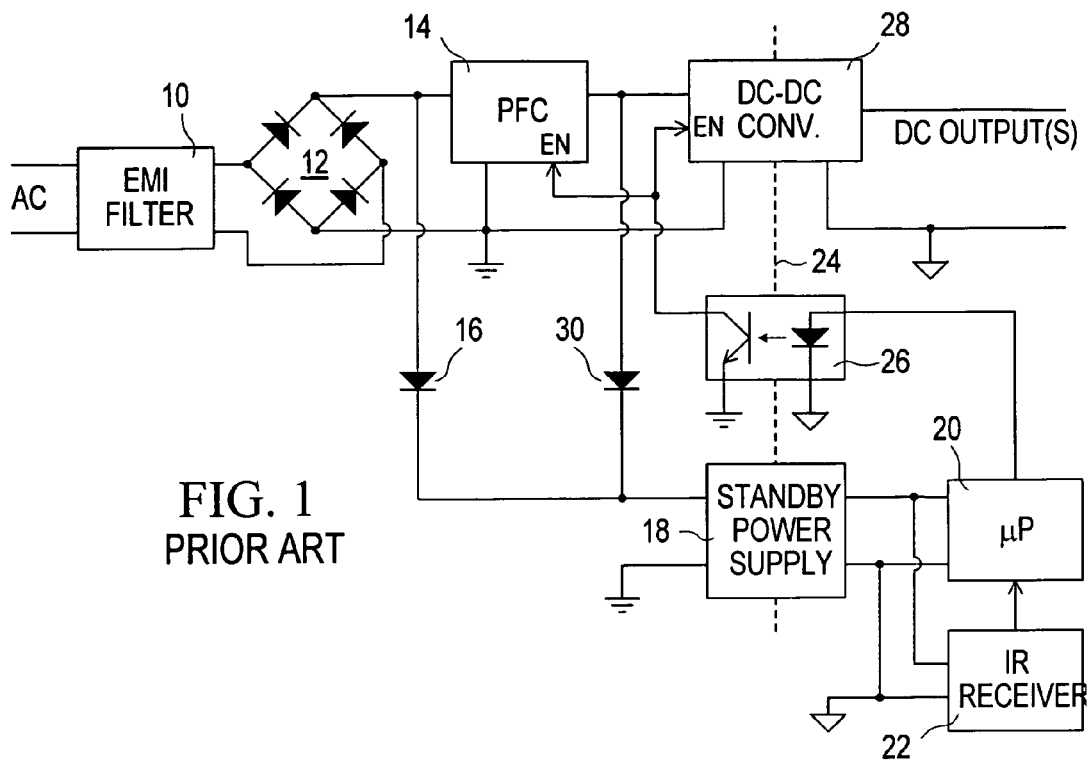
FIG. 1 illustrates a known standby arrangement for a consumer electronics product with a remote control receiver and a standby power supply.

Referring to the drawings, FIG. 1 illustrates a known standby arrangement for a consumer electronics product, referred to below simply as a product. For example, the product may be a television receiver or other home entertainment equipment. The product has a standby mode as well as at least one normal operating mode.

As shown in FIG. 1, an AC supply for the product is coupled via an EMI (electro-magnetic interference) filter 10 to a diode bridge rectifier 12, a DC output of which is coupled to a PFC (power factor correction) circuit 14 and via a diode 16 to a standby power supply 18. The standby power supply 18 may be a switch-mode converter which produces a regulated DC output constituting a power supply for a microprocessor (µP) 20 and an infrared (IR) signal receiver 22. The output of the standby power supply 18 is electrically isolated from the input, and hence from the AC supply, as shown by an isolation boundary represented by a dashed line 24.

The IR receiver 22 is responsive to IR signals, produced by a user's operation of a remote control unit (not shown) for controlling operation of the product, to supply corresponding signals to the microprocessor 20. In response to a remote control signal to turn on the product from its standby mode, the microprocessor 20 supplies an enable signal via an optocoupler 26 to enable inputs EN of the PFC circuit 14 and one or more DC-DC converters 28. The DC-DC converter(s) 28 are thus supplied with a DC output of the PFC circuit 14 and operate to produce one or more DC outputs for normal operation of the product. The optocoupler 26 and the DC-DC converter(s) 28, which can also be switch-mode converters, maintain the isolation boundary 24 between input and output sides of the arrangement.

When the PFC circuit 14 is enabled, the standby power supply is powered via a diode 30 from the output of the PFC circuit 14 instead of from the output of the diode bridge rectifier 12 via the diode 16.

Thus in the standby mode of the product, the standby power supply 18 is operable to supply power to the micro-processor 20 and the IR receiver 22, so that a remote control signal to turn on the product for normal operation can be received and responded to, but operation of the PFC circuit 14 and the DC-DC converter(s) 28 is not enabled, and power is not supplied to other parts of the product from the DC-DC converter(s) 28, so that power consumption of the product in its standby mode is reduced compared with power consumption in normal operation of the product.

However, as discussed above it is desirable to reduce power consumption in the standby mode to a very low level.

Figure 2:
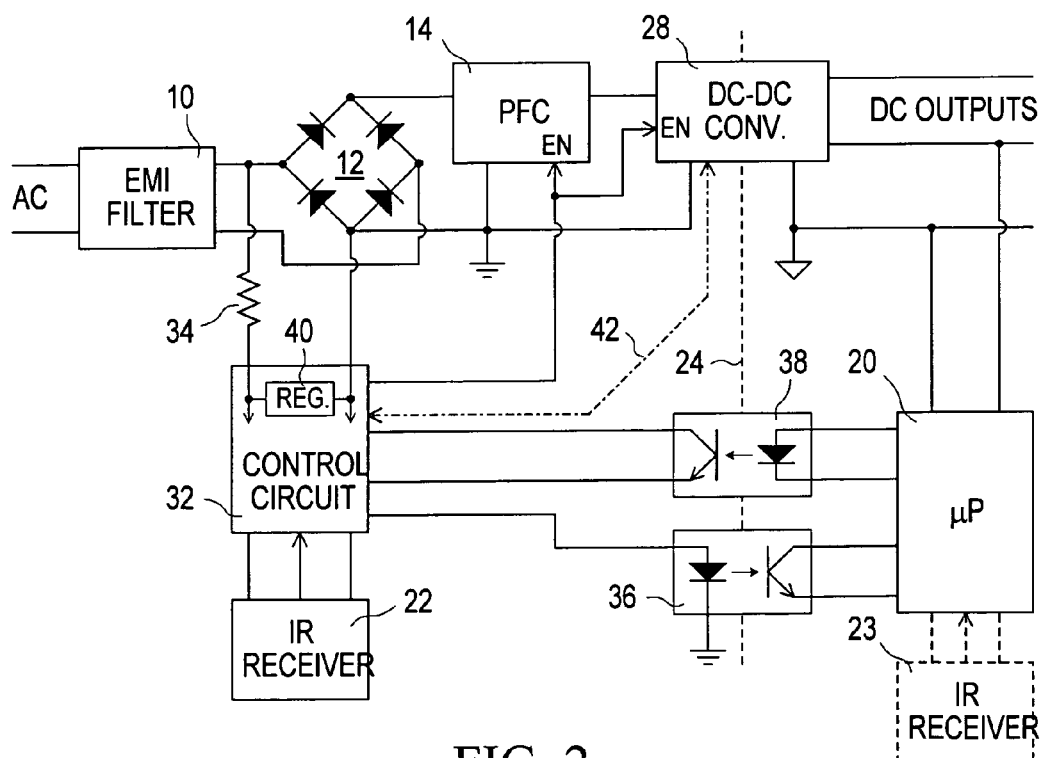
FIG. 2 illustrates by way of example a standby arrangement in accordance with an embodiment of this invention.

FIG. 2 illustrates by way of example a standby arrangement in accordance with an embodiment of this invention, that can be used to facilitate achieving such a very low power consumption in the standby mode.

In the standby arrangement of FIG. 2, an AC supply, EMI filter 10, diode bridge rectifier 12, PFC circuit 14, and DC-DC converters 28 are arranged in a similar manner to that of the standby arrangement of FIG. 1. The standby arrangement of FIG. 2 also includes a microprocessor 20 and IR receiver 22, but these are arranged differently from FIG. 1 as further described below. FIG. 2 also shows the isolation boundary 24 between input and output sides of the arrangement. The standby arrangement shown in FIG. 2 also includes a control circuit 32, a resistor 34, and two optocouplers 36 and 38 for coupling signals in opposite directions across the isolation boundary 24 between the control circuit 32 and the microprocessor 20.

More particularly, in the arrangement of FIG. 2 the enable inputs EN of the PFC circuit 14 and the DC-DC converters 28 are connected to an output of the control circuit 32. The microprocessor 20 in the arrangement of FIG. 2 receives its supply voltage from an output of one of the DC-DC converters 28, so that the microprocessor 20 is only powered when the DC-DC converters are enabled by the control circuit 32. In the arrangement of FIG. 2 the IR receiver 22 is on the input or ac supply side of the isolation boundary 24, with its signal output coupled to an input of the control circuit 32.

The control circuit 32 includes a power supply circuit, such as a shunt regulator (REG.) 40 in FIG. 2, for deriving a power supply for the control circuit 32 and for the IR receiver 22 from the diode bridge rectifier 12 via the resistor 34. To this end the resistor 34 is connected in series with this power supply circuit 40 across, i.e. in parallel with, one of the diodes of the diode bridge rectifier 12 as shown in FIG. 2. The resistor 34 has a high resistance, and the control circuit 32 and IR receiver 22 are designed to operate with a very low current, to minimize power consumption of these parts of the standby arrangement in the standby mode of the product.

For example, the control circuit 32 may be arranged to operate with a current of the order of 10 to 20 µA (microamps) and the resistance of the resistor 34 may be selected accordingly for AC supply voltages in a range from about 90 to about 280 volts, so that for all AC supply voltages the total standby power consumption of the arrangement is only a few mW (milliwatts).

In the standby mode of a product incorporating the standby arrangement of FIG. 2, the control circuit 32 and the IR receiver 22 are powered to be able to receive and respond to a turn on command signal from a remote control transmitter operated by a user. In response to such a command signal, the control circuit 32 enables the PFC circuit 14 and the DC-DC converters 28, thereby supplying power to the microprocessor 20 and to other parts of the product for normal operation, and forwards further command signals that may be received by the IR receiver 22 via the optocoupler 36 to the microprocessor 20 so that they can be responded to in conventional manner.

In response to a turn off command signal received from the IR receiver 22 via the optocoupler 36, or a shutdown command produced within the product, the microprocessor 20 supplies a shutdown signal via the optocoupler 38 to the control circuit 32, which accordingly terminates the enable signal for the PFC circuit 14 and the DC-DC converters 28, returning the product to its standby mode. It will be appreciated that the control circuit 32 can alternatively respond in a similar manner directly to a turn off command signal received via the IR receiver 22.

From the above description, it can be appreciated that in the standby mode of the product the control circuit 32, as far as received IR command signals are concerned, only needs to detect a turn on command signal. Accordingly this part of the control circuit 32 can have a relatively simple form that facilitates achieving the desired very low power consumption in the standby mode of the product.

On receipt and detection of a turn on command signal, in addition to enabling the PFC circuit 14 and the DC-DC converters 28 the control circuit 32 can also supply power to other parts of this control circuit 32 which may be provided for other purposes in normal operation of the product. For example, such other parts of the control circuit 32 may include circuits for facilitating control of the DC-DC converters 28, via control paths represented in FIG. 2 by a chained line 42.

It can be seen that the standby arrangement of FIG. 2 eliminates the diodes 16 and 30 and the standby power supply 18 of the arrangement of FIG. 1 by providing the resistor 34 and the control circuit 32, which can conveniently be implemented in an ASIC (application specific integrated circuit). The elimination of the standby power supply 18 of FIG. 1 facilitates reductions of both costs and power consumption. The low power shunt regulator 40 is easily incorporated in the ASIC of the control circuit 32, but can alternatively be provided separately. Any other desired form of regulator, for example a series pass regulator, can be provided instead of a shunt regulator, or the power supply circuit of the control circuit can be unregulated.

The optocouplers 36 and 38 of the arrangement of FIG. 2 can be replaced by another form of bidirectional signal coupler, such as a transformer, that preserves the isolation boundary 24 between the control circuit 32 and the microprocessor 20.

Figure 3:
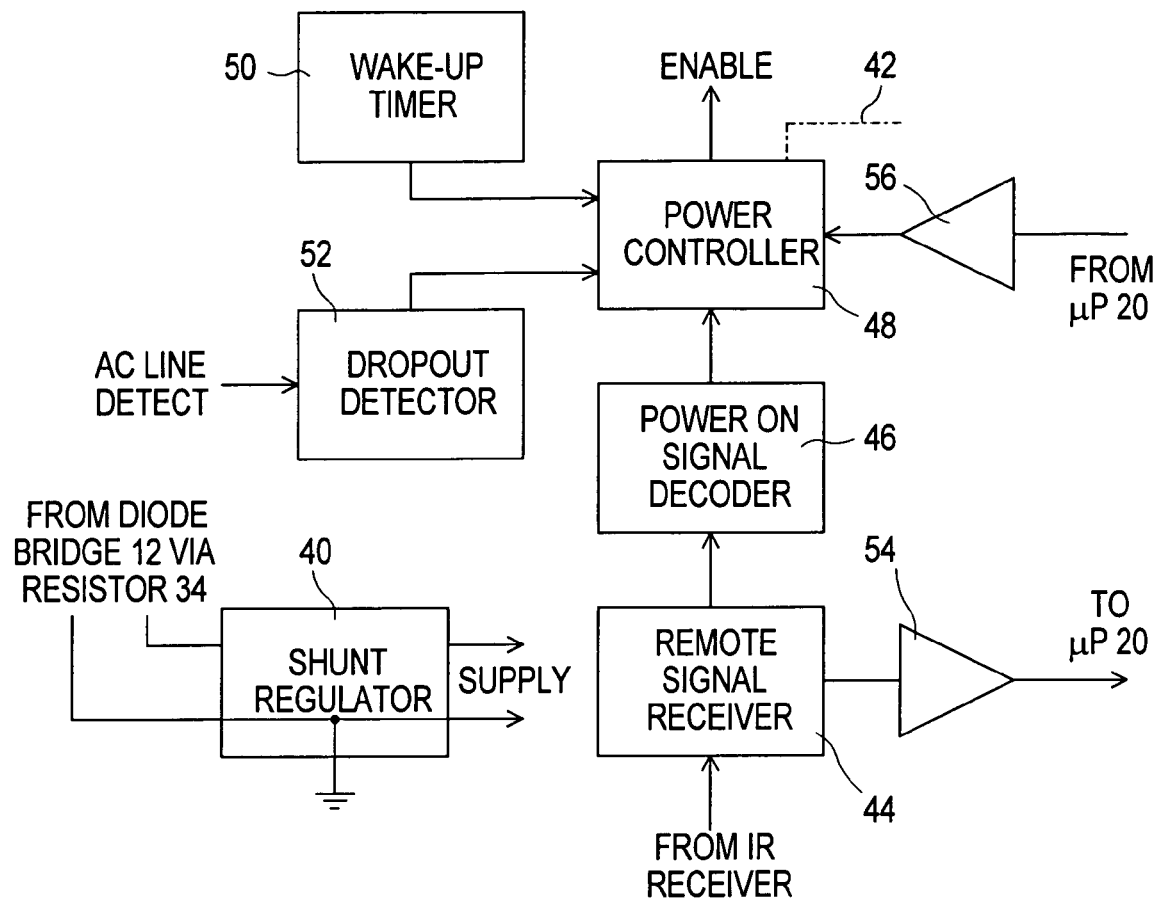
FIG. 3 illustrates a functional block diagram of one form of a control circuit of the standby arrangement of FIG. 2.

FIG. 3 illustrates a functional block diagram of one form of the control circuit 32 in the standby arrangement of FIG. 2. The functions of the control circuit 32 include the shunt regulator 40 which produces a supply voltage for the remainder of the control circuit 32 as described above, a remote signal receiver 44, a power on signal detector 46, a power controller 48, a wake-up timer 50, an AC power dropout detector 52, a signal transmit buffer 54, and a signal receive buffer 56.

Referring to FIG. 3, remote control signals from the IR receiver of FIG. 2 are supplied via the remote signal receiver 44 to the power on signal detector 46, which detects any power on or turn on signal from the remote control and on such detection provides an output to the power controller 48. The power controller 48 accordingly produces an enable output signal to enable the PFC 14 and DC-DC converters 28 as described above. The power controller 48 can at the same time enable power supply to additional circuitry for facilitating control of the DC-DC converters 28 via the control paths 42, as described above.

The remote signal receiver 44 also relays received remote control signal data via the transmit buffer 54 and the optocoupler 36 of FIG. 2 to the microprocessor 20. Thus with power supplied to the microprocessor 20 from one of the enabled DC-DC converters 28, the microprocessor 20 can execute other remote control functions, and the control circuit of FIG. 3 does not need to decode any remote control signals other than the power on signal.

The wake-up timer 50 serves for periodically supplying to the power controller 48 a signal to initiate supply of power to the microcontroller 20 to permit servicing of scheduled wake-up events such as the recording of a program. To this end it can be appreciated that the power controller 48 can provide separate enable signals (not shown) to respective ones of the DC-DC converters 28 to facilitate power supply to only some, and not necessarily all, of various parts of the product for respective functions (for example, recording of a television program does not require power to be supplied to a television display).

The dropout detector 52 is responsive to an AC line detect signal for detecting a failure, or a departure from normal levels, of the AC power supply to provide a shutdown command to the power controller 48. A shutdown command can also be supplied from the microprocessor 20 via the optocoupler 38 of FIG. 2 and the receive buffer 56 to the power controller 48. In response to any such shutdown command the power controller terminates the enable signal at its output, thereby returning the product to its standby mode. Thus the micro-processor 20 can carry out an orderly shutdown of parts of the product, ending with such a shutdown command to put the product into its standby mode.

Although the standby arrangements as described above use an IR receiver 22 for receiving infrared signals from a remote control unit, it can be appreciated that, for example, audio, ultrasonic, radio frequency or other wireless signals can be communicated instead of infrared signals, and the invention is not limited to infrared communications. In addition, although as described above remote control signals are relayed from the IR receiver 22 via the control circuit 32 and the optocoupler 38 to the microprocessor 20, it can be appreciated that alternatively another IR receiver 23, shown in dashed lines in FIG. 2, can be provided for receiving remote control IR signals and supplying them directly to the microprocessor 20 when it is powered in normal operation. Thus in this case the remote control signal receivers 22 and 23 can be used, one on each side of the isolation boundary 24, and the optocoupler 36 can be omitted.

Although as described above the isolation boundary 24 is maintained between the AC input and DC output sides of the power supply arrangement, the invention is not limited in this respect and is also applicable to arrangements in which the DC outputs are not isolated from the AC input. In this case the optocouplers 36 and 38 can be omitted and replaced by non-isolated connections between the control circuit 32 and the microprocessor 20.

Although particular forms of the invention are described above by way of example, it can be appreciated that numerous modifications, variations, and adaptations may be made without departing from the scope of the invention as defined in the claims.

The invention claimed is:

1. A standby arrangement comprising:
a power supply arrangement for supplying, when enabled, power from a power supply input to a power supply output in an operating mode;
a first control unit powered from the power supply input for enabling the power supply arrangement to supply power from the power supply input to the power supply output in response to a received remote control signal representing a power on signal; and
a second control unit powered from the power supply output and responsive to other received remote control signals;
the first control unit also being responsive to a power off signal from the second control unit to disable the power supply arrangement so that power is not supplied to the power supply output in a standby mode.

2. A standby arrangement as claimed in claim 1 wherein the first control unit is powered from the power supply input via a resistor and a shunt regulator.

3. A standby arrangement as claimed in claim 1 wherein the power supply arrangement provides electrical isolation between the power supply input and the power supply output, and the standby arrangement further includes an electrically isolating coupler for coupling the power off signal from the second control unit to the first control unit.

4. A standby arrangement as claimed in claim 3 and including an electrically isolating coupler for coupling remote control signal information received by the first control unit to the second control unit.

5. A standby arrangement as claimed in claim 3 wherein the power supply arrangement comprises at least one DC-DC converter having an enable input coupled to an output of the first control unit.

6. A standby arrangement as claimed in claim 5 wherein the power supply arrangement further comprises a power factor correction circuit having an output coupled to an input of said at least one DC-DC converter and having an enable input coupled to an output of the first control unit.

7. A standby arrangement as claimed in claim 1 wherein the first control unit comprises a timer for enabling the power supply arrangement to supply power from the power supply input to the power supply output at a desired time.

8. A standby arrangement comprising:
a receiver for receiving remote control signals;
a first control unit coupled to the receiver and responsive to a power on signal received by the receiver to produce an enable signal;
a power supply arrangement responsive to the enable signal to supply power from a power supply input to a power supply output in an operating mode;
a second control unit supplied with power from the power supply output, the second control unit being responsive to other received remote control signals; and
a coupler for coupling a power off signal from the second control unit to the first control unit, the first control unit being responsive to the power off signal to terminate the enable signal, termination of the enable signal disabling the power supply arrangement so that power is not supplied to the power supply output in a standby mode.

9. A standby arrangement as claimed in claim 8 wherein the power supply arrangement provides electrical isolation between the power supply input and the power supply output, and the coupler for coupling the power off signal from the second control unit to the first control unit is an electrically isolating coupler.

10. A standby arrangement as claimed in claim 9 and including an electrically isolating coupler for coupling said other received remote control signals from the receiver to the second control unit.

11. A standby arrangement as claimed in claim 9 and including another remote control signal receiver for supplying said other received remote control signals to the second control unit.

12. A standby arrangement as claimed in claim 8 wherein the first control unit is powered from the power supply input via a resistor and a shunt regulator.

13. A standby arrangement as claimed in claim 8 wherein the power supply arrangement comprises at least one DC-DC converter having an enable input to which said enable signal is supplied.

14. A standby arrangement as claimed in claim 13 wherein the power supply arrangement further comprises a power factor correction circuit having an output coupled to an input of said at least one DC-DC converter and having an enable input to which said enable signal is supplied.

15. A standby arrangement as claimed in claim 8 wherein the first control unit comprises a timer in response to which the first control unit produces said enable signal at a desired time.

* * * * *